(12) United States Patent
Lutaud

(10) Patent No.: US 9,845,882 B2
(45) Date of Patent: Dec. 19, 2017

(54) DOUBLE SEALING DEVICE

(71) Applicant: Carl Freudenberg KG, Weinheim (DE)

(72) Inventor: Dominique Lutaud, Orbigny au Mont (FR)

(73) Assignee: CARL FREUDENBERG KG, Weinheim (DE)

( * ) Notice: Subject to any disclaimer, the term of this patent is extended or adjusted under 35 U.S.C. 154(b) by 336 days.

(21) Appl. No.: 14/645,473

(22) Filed: Mar. 12, 2015

(65) Prior Publication Data
US 2015/0260291 A1 Sep. 17, 2015

(30) Foreign Application Priority Data
Mar. 12, 2014 (FR) ..................... 14 52053

(51) Int. Cl.
| | | |
|---|---|---|
| *F01D 11/02* | (2006.01) | |
| *F16J 15/3232* | (2016.01) | |
| *F16J 15/00* | (2006.01) | |
| *F16J 15/3228* | (2016.01) | |
| *F04D 29/043* | (2006.01) | |
| *F04D 29/12* | (2006.01) | |
| *F16J 15/322* | (2016.01) | |

(52) U.S. Cl.
CPC ........ *F16J 15/3232* (2013.01); *F04D 29/043* (2013.01); *F04D 29/126* (2013.01); *F16J 15/002* (2013.01); *F16J 15/004* (2013.01); *F16J 15/322* (2013.01); *F16J 15/3228* (2013.01)

(58) Field of Classification Search
CPC ...... F16J 15/3232; F16J 15/002; F16J 15/004; F16J 15/322; F16J 15/3228; F04D 29/043; F04D 29/126

USPC ................ 277/351, 349, 350, 353, 394, 402
See application file for complete search history.

(56) References Cited

U.S. PATENT DOCUMENTS

| | | | | |
|---|---|---|---|---|
| 2,167,603 | A * | 7/1939 | Victor ..................... | F16C 33/74 277/562 |
| 2,291,570 | A * | 7/1942 | Clark ................... | F16J 15/3212 277/577 |
| 2,348,586 | A * | 5/1944 | Antonelli ............... | F16J 15/004 277/563 |

(Continued)

FOREIGN PATENT DOCUMENTS

| | | |
|---|---|---|
| EP | 2554878 A1 | 2/2013 |
| FR | 2986598 A1 | 8/2013 |
| FR | 2995652 A1 | 3/2014 |

*Primary Examiner* — Nathan Cumar
(74) *Attorney, Agent, or Firm* — Leydig, Voit & Mayer, Ltd.

(57) ABSTRACT

A double sealing device for a rotating shaft comprising a first and a second seal of annular form mounted side by side in a peripheral groove formed in a wall of a circular cylindrical housing through which the shaft to be sealed passes. At least one of a discharge or vent channel opens into the peripheral groove between the two seals. The seals comprise a carrier ring with an outer axial flange and an inner radial flange, and a sealing washer applied to each carrier ring to cover a part of an outer face of the axial flange. A sealing lip bearing is formed slidably on the shaft, the first seal sealing a first fluid medium and the second seal sealing a second fluid medium. The axial flange has an extension forming a pierced structure, not covered by the sealing washer of the seal, and disposed facing the peripheral groove.

14 Claims, 3 Drawing Sheets

(56) References Cited

U.S. PATENT DOCUMENTS

| | | | | |
|---|---|---|---|---|
| 3,575,426 | A * | 4/1971 | Durham | F16J 15/40 |
| | | | | 277/432 |
| 5,009,435 | A * | 4/1991 | Villanyi | F16J 15/3232 |
| | | | | 277/552 |
| 5,199,718 | A * | 4/1993 | Niemiec | F04C 15/0038 |
| | | | | 277/552 |
| 5,727,794 | A * | 3/1998 | Fauchon | F16J 15/3268 |
| | | | | 277/551 |
| 6,561,519 | B1 | 5/2003 | Frese et al. | |
| 2003/0031828 | A1 * | 2/2003 | Kosty | F16J 15/3228 |
| | | | | 428/122 |
| 2004/0160016 | A1 * | 8/2004 | Hatch | F16J 15/328 |
| | | | | 277/551 |
| 2013/0200575 | A1 | 8/2013 | Humblot et al. | |

* cited by examiner

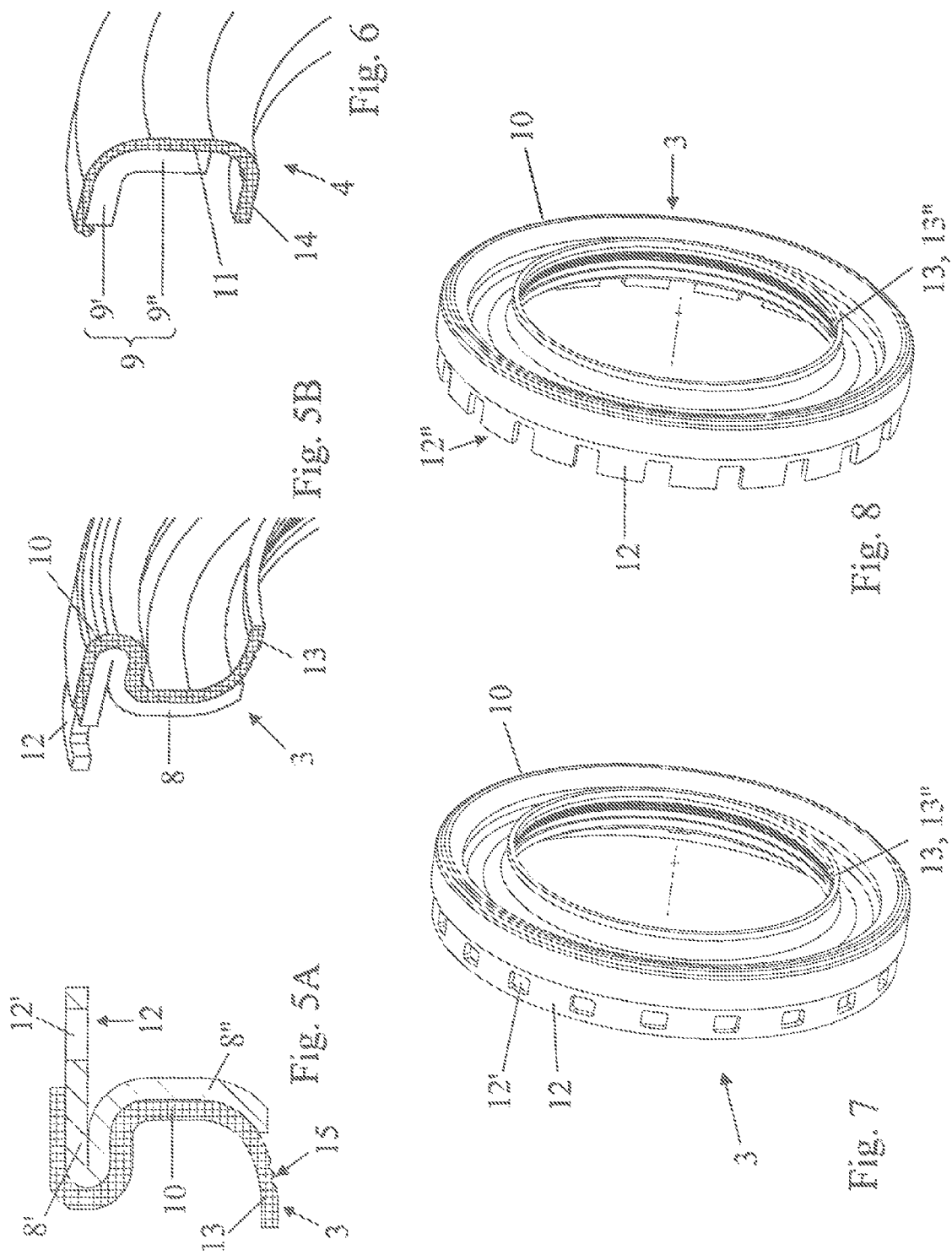

US 9,845,882 B2

DOUBLE SEALING DEVICE

CROSS-REFERENCE TO RELATED APPLICATIONS

Priority is claimed to French Patent Application No. FR 14 52053, filed on Mar. 12, 2014, the entire disclosure of which is hereby incorporated by reference herein.

FIELD

The present invention relates to the field of sealing rotating shafts or spindles, and more particularly to double sealing systems for isolating two media which are different from one another and from the external environment, the two media possibly being at different pressures.

BACKGROUND

Double sealing is typically provided by placing two seals in the housing through which the shaft passes, each seal being adapted for the corresponding medium to be sealed, the seals being positioned one after another, with a space between them, in the axial direction.

In the case of injection pumps, double sealing is currently provided in a conventional way, using, on the one hand, a rubber ring on the oil side, and, on the other hand, a rubber or PTFE sealing ring with a "special pressure" profile on the diesel fuel side.

The two parts are assembled head-to-tail in the different housing diameters, and a channel is machined in the housing between the two rings to discharge liquid to the outside in case of leakage. This channel also serves to maintain atmospheric pressure in this area.

This solution, one embodiment of which is shown in FIG. 1, has two major limitations identified by the inventors: it requires a large overall axial length, of the order of 20 mm at least (or 18.5 mm at the very least), and requires a housing with two compartments having different diameters, each adapted to one of the two seals.

If compartments of different radial sizes are not provided, it may be impossible to ensure the precise positioning of the seals, including their positioning relative to one another, or to prevent obstruction of the discharge channel.

SUMMARY

In an embodiment, the present invention relates to a double sealing device for a rotating shaft comprising a first and a second seal of annular form mounted side by side in a peripheral groove formed in a wall of a circular cylindrical housing through which the shaft to be sealed passes. At least one of a discharge or vent channel opens into the peripheral groove between the two seals. The seals comprise a carrier ring with an outer axial flange and an inner radial flange, and a sealing washer applied to each carrier ring to cover a part of an outer face of the axial flange. A sealing lip bearing is formed slidably on the shaft, the first seal sealing a first fluid medium and the second seal sealing a second fluid medium. The axial flange has an extension forming a pierced structure, not covered by the sealing washer of the seal, and disposed facing the peripheral groove.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 5A and 5B are partial views, in cross-section, in side elevation and in perspective, of the first seal of the device of FIGS. 2 to 4;

FIG. 6 is a partial sectional and perspective view of the second seal of the device of FIGS. 2 to 4, and FIGS. 7 and 8 are perspective views of the two variant embodiments of the first seal of the device according to the invention.

DETAILED DESCRIPTION

The present invention proposes a double sealing device and an injection pump comprising such a device.

In one aspect, the present invention provides a double sealing device for a rotating shaft, notably for a rotating shaft or spindle of a fuel injection pump, comprising a first and a second seals of annular form, mounted side by side in a circular cylindrical housing through which the shaft to be sealed passes and into which a discharge and/or vent channel opens, in a peripheral groove formed in or associated with the wall of the housing, between the two seals.

Each of these seals is composed of, on the one hand, a carrier ring of metal material with an outer axial flange and an inner radial flange and, on the other hand, a sealing washer, preferably PTFE-based and applied to the corresponding carrier ring so as to cover at least a part of the outer face of its axial flange, thereby forming a seal between the latter and the wall of the housing as well as the adjacent face of the radial flange, and so as to extend beyond the free end of the radial flange to form a sealing lip bearing slidably on the shaft to be sealed, the first seal keeping a first fluid medium sealed off from the peripheral groove and the second seal keeping a second fluid medium sealed off from this groove.

The double sealing device is characterized in that the axial flange of at least one of the carrier rings of the first and second seals has an extension at its free end forming a pierced or cut-out ring structure, not covered by the sealing washer of the corresponding seal, and located substantially facing the peripheral groove and pointing towards the other seal.

The invention will be more easily understood with the aid of the following detailed description, which relates to some preferred embodiments, provided by way of non-limiting example and explained with reference to the attached schematic drawings.

Figure 1:
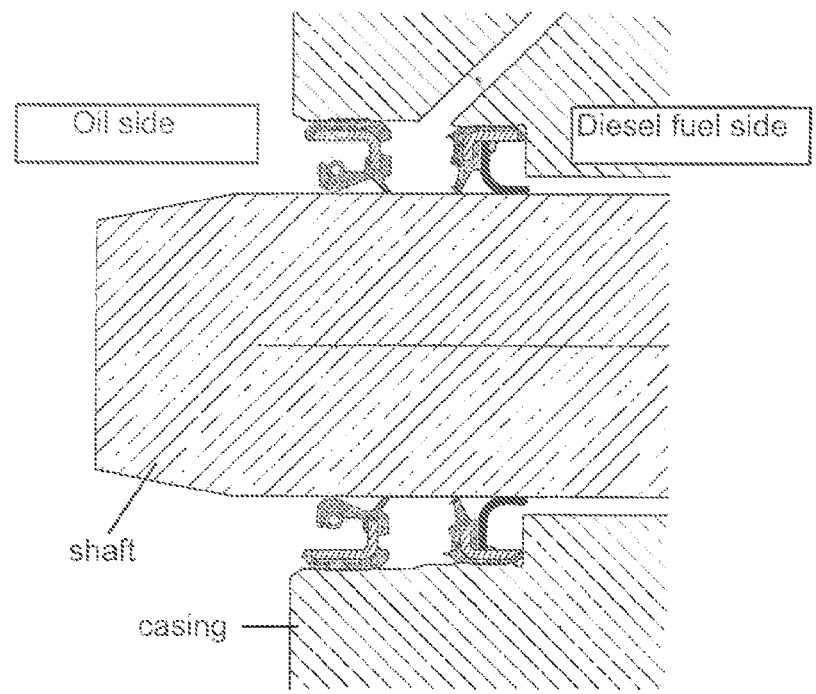
FIG. 1 is a partial sectional view of an injection pump configured with a known double-sealing arrangement.
Figure 4:
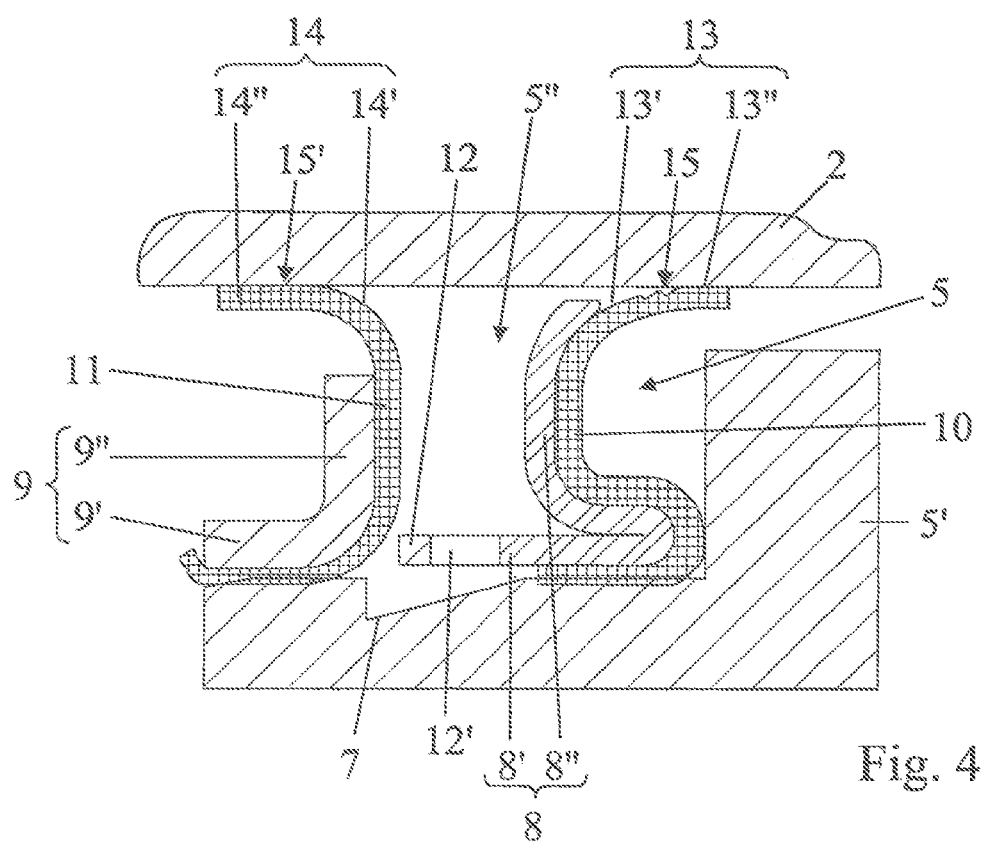
FIGS. 3 and 4 are views in side elevation, and on a different scale, of the details A (FIG. 3) and B (FIG. 4) of FIG. 1.
Figure 3:
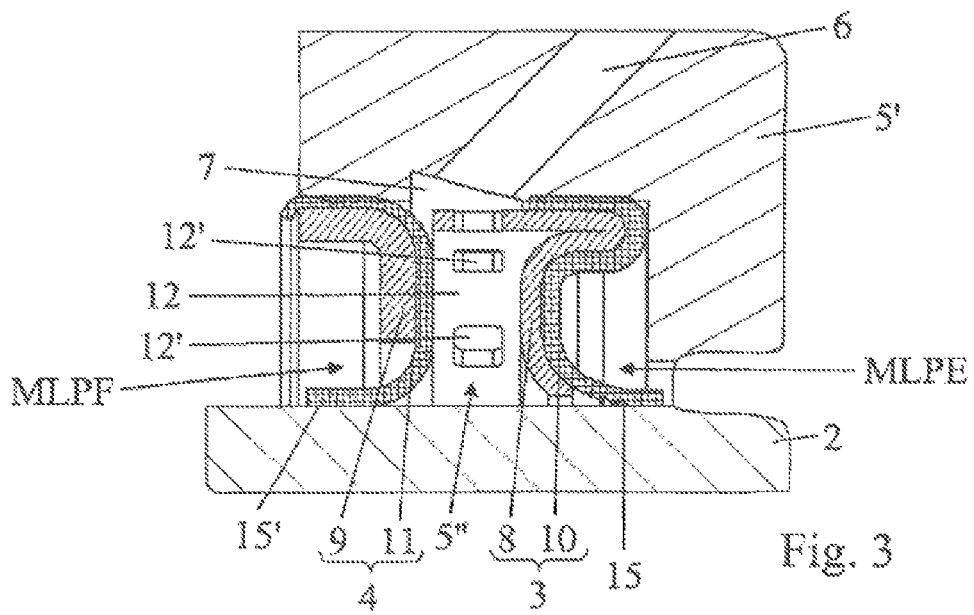

FIG. 1 shows, and FIGS. 3 and 4 partially show, a double sealing device 1 for a rotating shaft 2, notably for a rotating shaft or spindle of a fuel injection pump.

This device comprises a first 3 and a second 4 seal of annular form, mounted side by side in a circular cylindrical housing 5 through which the shaft 2 to be sealed passes and into which a discharge and/or vent channel 6 opens, in a peripheral groove 7 formed in or associated with the wall of the housing 5, between the two seals 3 and 4, Each of these seals 3 and 4 is composed, on the one hand, of a carrier ring 8 or 9 of metal material with an outer axial flange 8' or 9' and an inner radial flange 8" or 9" and, on the other hand, of a sealing washer 10 or 11, preferably PTFE-based and applied to the corresponding carrier ring 8 or 9 so as to cover at least a part of the outer face of its axial flange 8' or 9', thereby forming a seal between the latter and the wall of the housing 5 as well as the adjacent face of the radial flange 8" or 9", and so as to extend beyond the free end of the radial flange 8" or 9" to form a sealing lip 13 or 14 bearing slidably on the shaft 2 to be sealed. The first seal 3 seals off a first fluid medium MLPE from the peripheral groove 7, and the second seal 4 seals off a second fluid medium MLPF from this groove 7.

Figure 2:
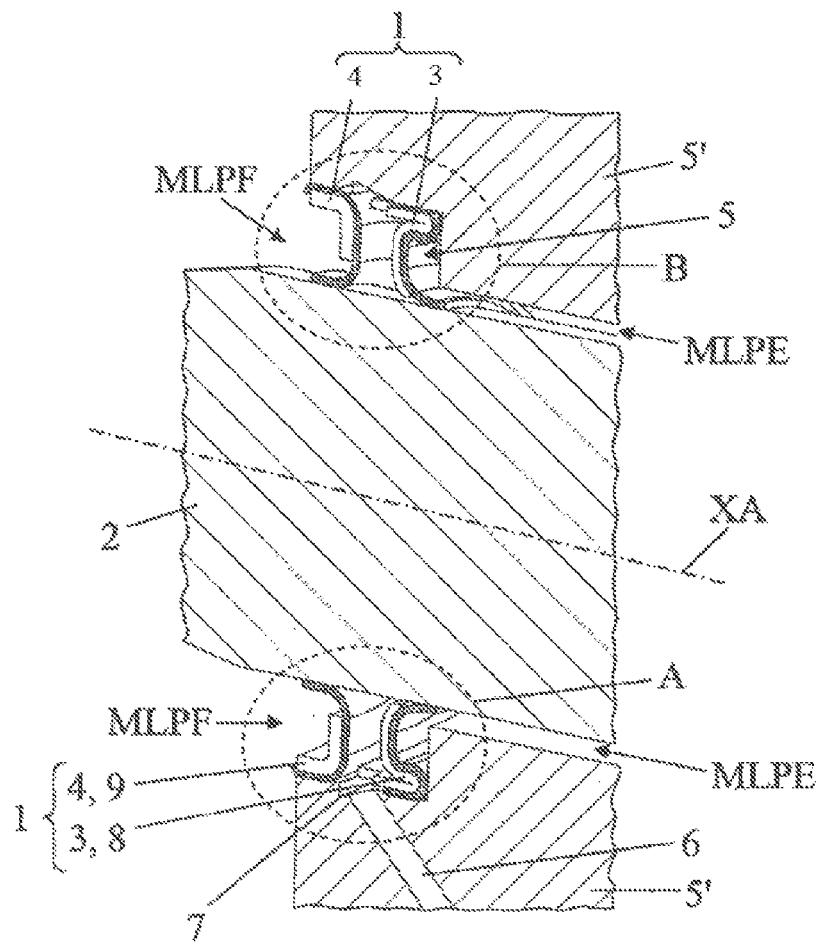
FIG. 2 is a partial sectional view, taken along a plane containing the median axis of the shaft to be sealed, of an injection pump or the like fitted with a double sealing device according to one embodiment of the invention.

As shown by FIG. 2, the housing 5, receiving the two seals 3 and 4, may have a constant diameter, is formed in a casing or shell 5', and may form part of a passage through which the shaft 2 passes (this passage may if necessary include one or more bearings, which are not shown, for guiding the shaft).

According to an aspect of the invention, the axial flange 8', 9' of at least one of the carrier rings 8, 9 of the first and second seals 3, 4 has an extension at its free end forming a pierced or cut-out ring structure 12, not covered by the sealing washer 10, 11 of the corresponding seal 3, 4, and located substantially facing the peripheral groove 7 and pointing towards the other seal 4, 3.

Preferably, the two seals 3 and 4 are fitted side by side and tightly (preferably with slight compression) in the housing 5, and are preferably abutting in the axial direction XA, said at least one pierced or cut-out ring 12 also forming an axial separating or spacing structure between the two seals 3 and 4, while keeping the peripheral groove 7 substantially clear over its whole width.

Thus the two seals 3 and 4 may be positioned in a precise way as closely as possible to one another in the axial direction XA, while ensuring that the free space 5", whose width is calibrated (by the width of the ring 12), located between the two seals 3 and 4, is in fluid communication with the groove 7 (and therefore with the channel 6).

According to a first variant embodiment, shown in FIGS. 2 to 5 and 7, the pierced ring 12, formed as one piece in the extension of the axial flange 8', comprises piercings 12' which are regularly spaced over the perimeter of the carrier ring 8 in question.

According to a second variant embodiment, shown in FIG. 8, the pierced ring 12, formed as one piece in the extension of the axial flange 8' of the carrier ring 8 in question, has a crenellated free edge 12".

Preferably, and as shown in FIGS. 2 to 8, only one of the two seals 3 and 4, preferably the first seal 3 which seals off the medium MLPE having the higher pressure, has a pierced or cut-out spacing ring 12.

A person skilled in the art will understand that the two seals 3 and 4 forming the device 1 are mounted by introducing the first seal 3 into the housing 5 under pressure and moving it to the bottom of the housing across the groove 7.

The latter is advantageously made in the form of a fitting chamfer having a small angle at the top, advantageously below 30°, and preferably of about 15°, in the direction of introduction of said seal 3.

By using a stop to position this first seal 3 at the end of fitting, the two mutually adjacent components 3 and 4 of the device 1 can be precisely and repeatedly located with respect to said groove 7.

Additionally, since there is a constant diameter housing 5 (having the same diameter for both axial portions of the housing receiving the first seal 3 and the second seal 4 respectively), no further compression is necessary when the first seal is placed in its final position (the compression that it undergoes in the first phase of its introduction, before passing over the groove 7, is sufficient for this final placing). This greatly limits the risk of seizing of the portion of the sealing washer 10 covering the outer face of the axial flange 8' of the ring 8 of the seal 3.

It is also possible to envisage an embodiment of the invention in which no special groove 7 is formed in the wall of the housing 5. In fact, the interstice between the ring 12 and the inner wall of the housing 5 (provided by the thickness of the portion of the compressed washer 10 covering the axial flange 8') could provide a circular peripheral channel similar to a groove of this type, into which the piercings 12', on one hand, and the outflow channel 6, on the other hand, would open.

Advantageously, and in order to obtain a good dynamic seal around the shaft 2, provision may be made for the sealing lip 13, 14 of each seal 3, 4 to be formed by a curved annular linking portion 13', 14' and an annular end portion 13", 14", most of which bears slidably on the shaft or spindle to be sealed 2, said annular end portion 13", 14" being advantageously provided with a return portion 15, 15' which is helical or in the form of a thread, or advantageously in the form of a groove with opposite sides having different inclinations or gradients, preferably with an asymmetric triangular cross-section or profile.

As shown, by way of example, in FIGS. 3 to 5 notably, one 8 of the carrier rings 8, 9, preferably that of the first seal 3 which seals off the medium MLPE under the higher pressure, and which has the extension 12 forming a pierced spacing ring, has a cross-section substantially in the form of a lower-case letter tau (t), with an incurved radial flange 8", the sealing washer 10 extending on the inner face of this incurved radial flange 8", pointing towards the medium MLPE under high pressure.

Together with this construction of the first seal 3, provision may also be made for the sealing lip 13 to have a small thickness, typically of less than 0.8 mm, and to form, in the absence of constraints, a truncated sleeve with a top angle preferably in the range from 40° to 80° and orientated towards the medium MLPE to be sealed off.

This first seal 3 may, in particular, be a seal having the characteristics of the subject of French patent application no. 12 58667 in the name of the present applicant.

According to another advantageous characteristic of the invention, shown notably in FIGS. 3, 4 and 6, one of the carrier rings 8, 9, preferably that of the second seal 4 which seals off the medium MLPF under lower pressure, has an L-shape or a chevron shape in cross-section, the corresponding sealing washer 11 being applied to the outer faces of the radial flange 9" and axial flange 9', that is to say the faces on the opposite side from the medium MLPF under pressure to be sealed off.

This second seal 4 may, in particular, be a seal having the characteristics of the subjects of French patent applications nos. 2 554 878 and 2 986 598 in the name of the present applicant.

By using the aforesaid particular two types of seals, the double sealing device 1 according to the invention can provide a sufficient seal for the two media MLPE and MLPF, while requiring only a minimal overall axial length, particularly a length of only about 10 mm.

The invention also proposes, as shown partially in FIG. 1, an injection pump with a rotating spindle or shaft 2 extending simultaneously into a first space MLPE subjected to a high fluid pressure, namely the pressure of petrol or diesel fuel, and into a second space MLPF subjected to a lower fluid pressure, namely the pressure of oil.

This pump is characterized in that it comprises a double sealing device 1 as described above.

Clearly, the invention is not limited to the embodiments described and represented in the appended drawings. Modifications may be made, notably in terms of the composition of the various elements, or by substitution of equivalent methods, without thereby departing from the scope of protection of the invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A double sealing device for a rotating shaft, notably for a rotating shaft or spindle of a fuel injection pump, the double sealing device comprising:
    a first and a second seal of annular form, the first and second seal mounted side by side in a peripheral groove formed in a wall of a circular cylindrical housing through which the shaft or spindle to be sealed passes, wherein at least one of a discharge or vent channel opens into the peripheral groove between the two seals, wherein each of the first and second seals comprises:
        a carrier ring of metal material with an outer axial flange and an inner radial flange, and
        a sealing washer applied to each corresponding carrier ring so as to cover at least a part of an outer face of the axial flange, thereby forming a seal between the axial flange and the wall of the housing as well as an adjacent face of the radial flange, and so as to extend beyond a free end of the radial flange to form a sealing lip bearing slidably on the shaft or spindle to be sealed, the first seal keeping a first fluid medium sealed off from the peripheral groove and the second seal keeping a second fluid medium sealed off from the peripheral groove,
    wherein the axial flange of at least one of the carrier rings of the first and second seals has an extension at its free end forming a pierced or cut-out ring structure, not covered by the sealing washer of the corresponding seal, and disposed substantially facing the peripheral groove and pointing towards the other of the first and second seals, and
    wherein the two seals are fitted side by side and tightly in the housing, and are abutting in an axial direction of the shaft or spindle, said at least one pierced or cut-out ring structure also forming an axial separating or spacing structure between the two seals, while keeping the peripheral groove substantially clear over its whole width.

2. The device according to claim 1, wherein the pierced or cut-out ring structure is formed as one piece in the extension of the axial flange, and comprises piercings which are regularly spaced over a perimeter of the respective carrier ring.

3. The device according to claim 1, wherein the pierced or cut-out ring structure is formed as one piece in the extension of the axial flange of the respective carrier ring, and has a crenellated free edge.

4. The device according to claim 1, wherein only one of the two seals has a pierced or cut-out ring structure.

5. The device according to claim 1, wherein the sealing lip of each of the first and second seals is formed by a curved annular linking portion and an annular end portion, the majority of which bears slidably on the shaft or spindle to be sealed, at least one of said annular end portions including a return portion which is at least one of helical or in the form of a thread.

6. The device according to claim 1, wherein one of the carrier rings has a cross-section substantially in the form of a lower-case letter tau ($\tau$), with an incurved radial flange, the sealing washer of the one of the carrier rings extending on an inner face of the incurved radial flange, pointing towards a medium under high pressure.

7. The device according to claim 6, wherein the sealing lip of the sealing washer of the one of the carrier rings has a thickness of less than 0.8 mm, and forms, in the absence of constraints, a truncated sleeve with a top angle in the range from 40° to 80° and oriented towards the medium under high pressure, wherein the medium under high pressure comprises the first fluid medium, and wherein the first fluid medium comprises MLPE.

8. The device according to claim 1, wherein one of the carrier rings has at least one of an L-shape or a chevron shape in cross-section, the corresponding sealing washer being applied to outer faces of the radial flange and axial flange on an opposite side from a medium under pressure to be sealed off.

9. An injection pump with a rotating shaft or spindle extending simultaneously into a first space subjected to a high fluid pressure and into a second space subjected to a lower fluid pressure, the pump including a double sealing device comprising:
    a first and a second seal of annular form, the first and second seal mounted side by side in a peripheral groove formed in a wall of a circular cylindrical housing through which the shaft or spindle to be sealed passes, wherein at least one of a discharge or vent channel opens into the peripheral groove between the two seals, wherein each of the first and second seals comprises:
- a carrier ring of metal material with an outer axial flange and an inner radial flange, and
- a sealing washer applied to each corresponding carrier ring so as to cover at least a part of an outer face of the axial flange, thereby forming a seal between the axial flange and the wall of the housing as well as an adjacent face of the radial flange, and so as to extend beyond a free end of the radial flange to form a sealing lip bearing slidably on the shaft or spindle to be sealed, the first seal keeping a first fluid medium sealed off from the peripheral groove and the second seal keeping a second fluid medium sealed off from the peripheral groove, wherein the axial flange of at least one of the carrier rings of the first and second seals has an extension at its free end forming a pierced or cut-out ring structure, not covered by the sealing washer of the corresponding seal, and disposed substantially facing the peripheral groove and pointing towards the other of the first and second seals, and wherein the two seals are fitted side by side and tightly in the housing, and are abutting in an axial direction of the shaft or spindle, said at least one pierced or cut-out ring structure also forming an axial separating or spacing structure between the two seals, while keeping the peripheral groove substantially clear over its whole width.

10. The device according to claim 1, wherein the sealing washer is PTFE-based.

11. The device according to claim 4 wherein the one of the two seals is the first seal, which seals off the first fluid medium having a higher pressure than the second fluid medium, wherein the first fluid medium comprises MLPE.

12. The device according to claim 5, wherein the return portion is in the form of a groove with opposite sides having different inclinations or gradients, preferably with an asymmetric triangular cross-section or profile.

13. The device according to claim 6, wherein the medium under high pressure comprises the first fluid medium, wherein the one of the carrier rings is the carrier ring corresponding to the first seal, which seals off the first fluid medium, and which has the extension forming the pierced or cut-out ring structure, and wherein the first fluid medium comprises MLPE.

14. The device according to claim 8, wherein the medium under pressure to be sealed off comprises the second fluid medium, wherein the one of the carrier rings is the carrier ring corresponding to the second seal, which seals off the second fluid medium, wherein the second fluid medium comprises MLPF, and wherein the second fluid medium is under lower pressure than the first fluid medium.

* * * * *